United States Patent [19]

Arimura et al.

[11] 3,964,533
[45] June 22, 1976

[54] PNEUMATIC RADIAL TYPE TIRE HAVING AN IMPROVED DURABILITY IN BEAD SECTION

[75] Inventors: Iwao Arimura, Kodaira; Akio Sato, Higashi-Murayama; Hironori Hirano, Akigawa, all of Japan

[73] Assignee: Bridgestone Tire Company Limited, Tokyo, Japan

[22] Filed: Feb. 21, 1975

[21] Appl. No.: 551,951

[30] Foreign Application Priority Data

Feb. 28, 1974 Japan............................ 49-22880

[52] U.S. Cl............................ 152/362 R; 152/354; 152/362 CS; 152/374
[51] Int. Cl.² ................... B60C 15/06; B60C 9/10
[58] Field of Search.......... 152/362 R, 362 CS, 374, 152/354

[56] References Cited
UNITED STATES PATENTS

| 3,557,860 | 1/1971 | Maiocchi | 152/362 R |
| 3,612,137 | 10/1971 | Guyot | 152/362 R |
| 3,612,138 | 10/1971 | Ravenhall | 152/362 R |
| 3,722,568 | 3/1973 | Maiocchi | 152/362 CS |
| 3,736,973 | 6/1973 | Mezzanotte | 152/362 R |
| 3,800,844 | 4/1974 | Boileau | 152/362 R |

Primary Examiner—Drayton E. Hoffman
Attorney, Agent, or Firm—Sughrue, Rothwell, Mion, Zinn & Macpeak

[57] ABSTRACT

A pneumatic radial type tire having an improved durability in bead section comprises at least one carcass ply composed of metal cords in a substantially radial arrangement, at least one chafer composed of rubberized metal cords, a carcass reinforcing member secured to the surface of the carcass ply and composed of at least two rubberized cord fabrics whose cords are crossed with each other at an angle larger than 60° with respect to the cord direction of the carcass ply, and a rubber stiffener composed of a composite rubber stock having a hardness which is made smaller at the upper part than at the lower part thereof.

14 Claims, 5 Drawing Figures

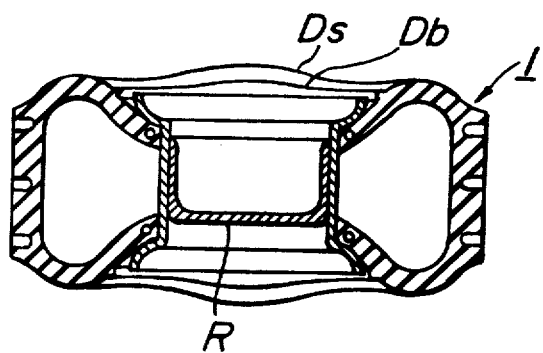
FIG_1
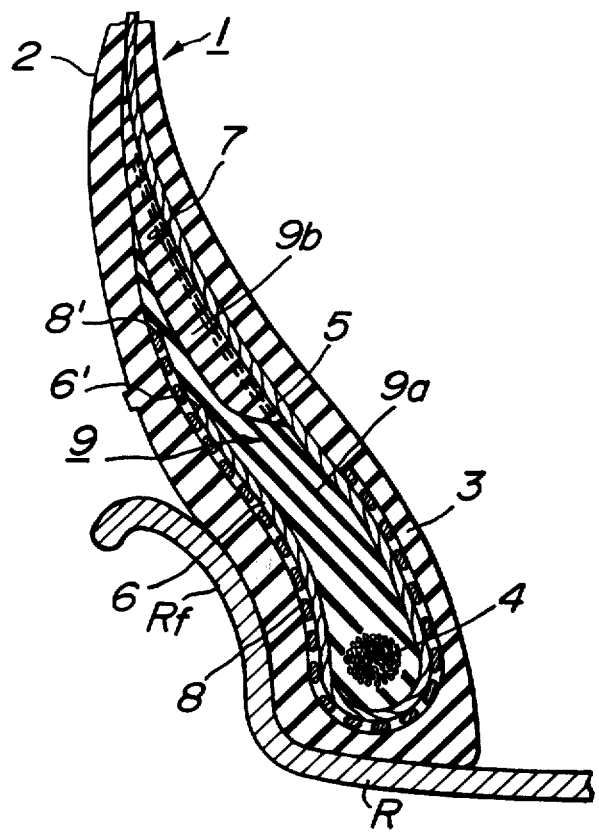
FIG_2

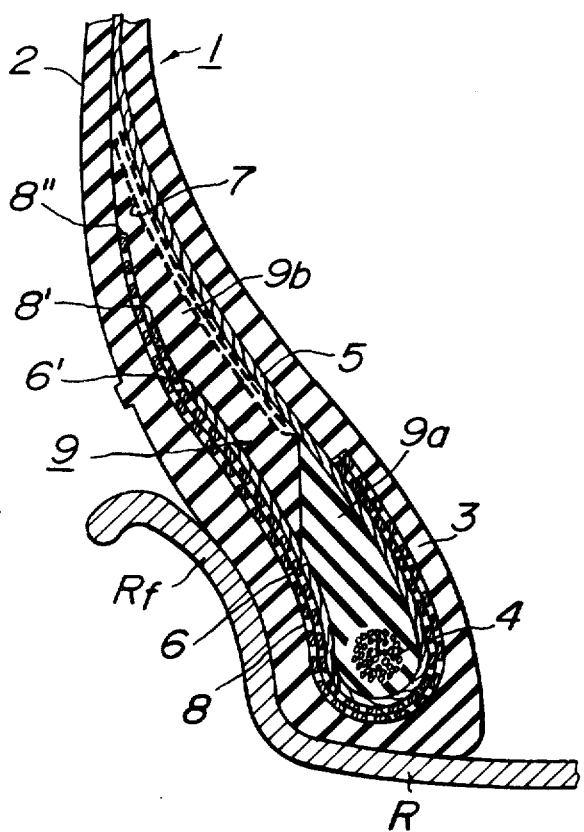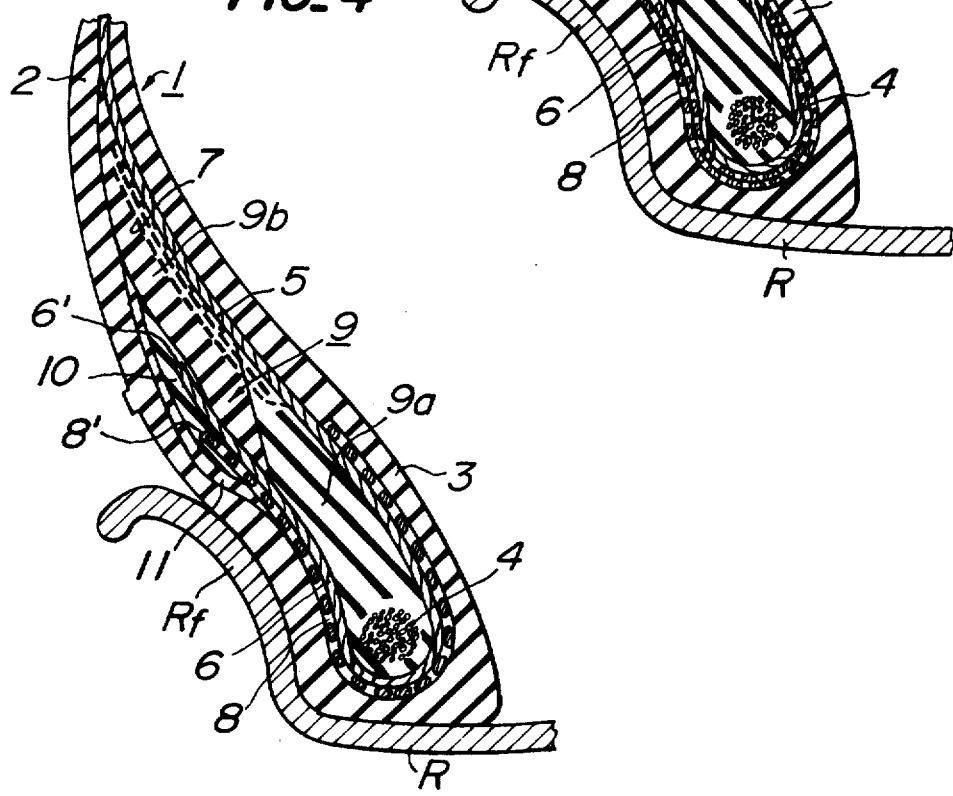

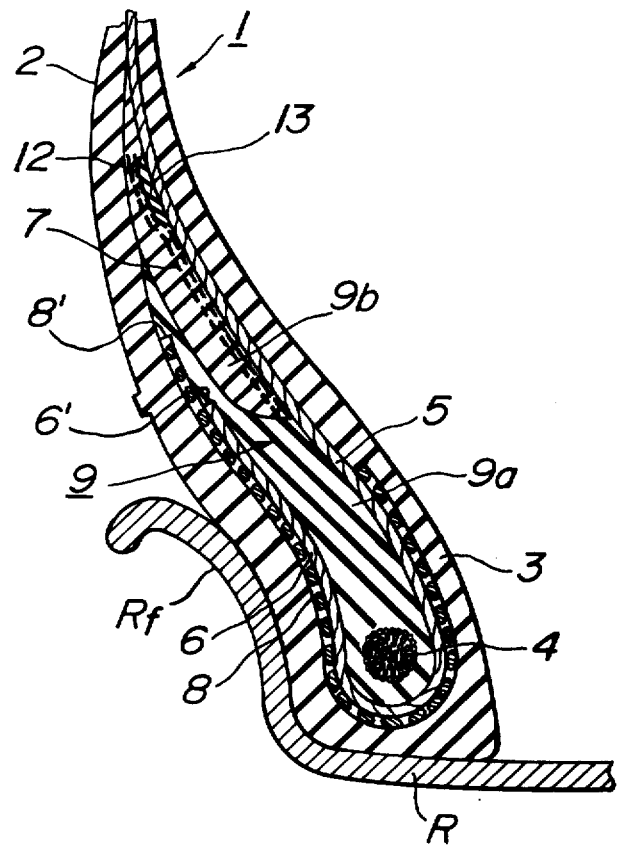
FIG_5

PNEUMATIC RADIAL TYPE TIRE HAVING AN IMPROVED DURABILITY IN BEAD SECTION

The present invention relates to pneumatic tires and more particularly to pneumatic radial type tires having an improved durability in bead section.

In the tires of this type, there is generally provided at least one carcass ply composed of cords and folded outwardly of the tire around a bead core. In many cases, metal cords and particularly steel cords are used as the cord for carcass ply. The carcass ply has a tire fabric structure of cords arranged substantially perpendicular to circumferential direction of the tire, that is, a substantially radial cord arrangement.

In the radial tires using metal cords for carcass ply, a very hard single rubber stock having a substantially lengthwise triangular form in cross section is filled as a rubber stiffener in a space defined between the carcass ply and its turned-over portion while surrounding the bead core, and a chafer composed of at least one woven fabric of metallic and/or fibrous materials is arranged at the turned-over ply portion, whereby the bead sections of the tire are rigidly stiffened and further the rigidity in the boundary region between side wall and bead section is enhanced.

Such rigidity enhancement in bead section contributes to prevent not only an excessive distortion caused around the bead core by the tension of the carcass ply under nominal inflation pressure, but also an excessive bending deformation followed to lateral force such as centrifugal force caused by cornering operation and the like under load, because the single carcass ply is generally used as a carcass reinforcement so that the bead section has a weak resistance to the lateral force against the tire.

In order to accomplish the rigidity enhancement, for instance, there is disclosed in U.S. Pat. No. 3,557,860 that a metal cord reinforcing layer is used as a chafer and arranged at an angle of 70°–30° with respect to the cord direction of the carcass ply. However, the cut end of each metal cord at the turned-over ply portion and the reinforcing layer, which is unable to be subjected to a surface treatment for improving the adhesive propety of the cord to rubber (e.g. brass plating), is exposed to the tire rubber, so that the separation of cord from rubber is caused at these cut ends although the bead section is rigidly stiffened.

The inventors have made various investigations and experiments with respect to a mechanism causing cord separation in bead section and found the following facts. That is, the bead section of the tire is strongly forced to a rim flange under the influence of nominal inflation pressure, so that a rubber stiffener existent between the carcass ply and its turned-over portion is pressed under a reactive force caused by the rim flange and is liable to be pushed out of the bead section. As a result, the rubber stiffener is distorted at the cut end of each metal cord in a direction of separating the rubber from the metal cord, that is, in radial direction of the tire, at which the separation of the cord from the rubber is apt to be caused due to the incomplete adhesion of the rubber to the cut end of the cord. As is well-known, the flexing of the radial tire under the load is fairly larger than that of ordinary bias tires as shown by a deformation in a widthwise direction of side wall section (Ds) in FIG. 1. This deformation follows a deformation in bead section (Db) as shown in FIG. 1 so as to diverge an interval between the cords of the carcass ply in circumferential direction of the tire, whereby the rubber between the cords of the carcass ply is distorted in circumferential direction of the tire. These distortions of the rubber in both radial and circumferential directions as mentioned above is repeatedly caused once every revolution of the tire. As a result, these distortions readly spread to the cut end of the cord and finally cause the separation of the cords from the rubber in the bead section.

Therefore, it is an object of the invention to improve the durability in the bead section of the tire by effectively preventing the occurrence of the distortion in each of the above mentioned directions.

The present invention provides a pneumatic radial type tire having an improved durability in bead section comprising at least one carcass ply composed of metal cords in a substantially radial arrangement and folded outwardly of the tire around a bead core and a bead reinforcing structure inclusive of at least one chafer composed of rubberized metal cords and arranged at a turned-over portion of the carcass ply, said tire further comprising a carcass reinforcing member secured to the surface of said carcass ply opposing to that end of the cord at an outermost side of at least one of said turned-over ply portion and said chafer in radial direction of the tire, and a rubber stiffener disposed between the carcass ply and its turned-over portion and extending outwardly from its base end beyond said outermost end of the cord in radial direction of the tire while surrounding said bead core, said carcass reinforcing member being composed of at least two rubberized cord fabrics whose cords are crossed with each other at an angle larger than 60° with respect to the direction of cord arrangement of the carcass ply, and said rubber stiffener being composed of a composite rubber stock having a hardness which is made smaller at the upper part along said carcass reinforcing member than at the lower part in vicinity of said base end of the stiffener.

According to the present invention, the divergence between the mutual cords of the carcass ply composed of metal cords in a substantially radial arrangement is effectively restrained in the upper part of the bead section by means of the carcass reinforcing member. Further, the deformation of the composite rubber stiffener by the press between the carcass ply and its turned-over portion is effectively absorbed by using the composite rubber stock having a hardness smaller at the upper part between the cord end and the carcass reinforcing member than at the lower part thereof as the stiffener. Therefore, it is possible to prevent the spreading of the distortions at the bead section in circumferential and radial directions of the tire to that end of the cord terminating at the outermost side of at least one of the turned-over ply portion and the metal cord chafer in radial direction of the tire.

The relation in radial direction of the tire between the carcass reinforcing member and that end of the cord at the outermost side of at least on of the turned-over ply portion and the metal cord chafer is preferred so that the upper end of the carcass reinforcing member extends outwardly beyond the cord end. However, if the carcass reinforcing member has an effective structure for restraining the divergence between the cords of the carcass ply at a position corresponding to the cord end, the upper end of the carcass reinforcing member may be equal to or slightly lower than the cord end.

Although the angle of the carcass reinforcing member with the carcass ply is not always made larger than 60° over the whole width of the carcass reinforcing member, the angle larger than 60° must be maintained at that upper portion of the carcass reinforcing member in radial direction of the tire, said portion giving a most reinforcement effect to that end of the cord at the outermost side of at least one of the turned-over ply portion and the metal cord stiffener in radial direction of the tire. Further, the carcass reinforcing member must be composed of at least two cord fabrics whose cords are crossed with each other at the above angle with respect to the direction of cord arrangement of the carcass ply.

The invention will now be described in greater detail with reference to the accompanying drawings, wherein:

FIG. 1 is a cross sectional view illustrating a deformation of a pneumatic radial type tire under ground contact; and FIGS. 2, 3, 4 and 5 are cross sectional views in bead section of various embodiments of the pneumatic raidal type tire according to the invention, respectively.

Like parts are designated by like numerals and symbols throughout the different figures of the drawing.

FIG. 2 shows a bead section of an embodiment of the pneumatic radial type tire according to the invention, wherein 1 represents a tire, 2 a side wall of the tire, 3 a bead section extending from the side wall 2, 4 a bead core, 5 a carcass ply, 6 a turned-over portion of the carcass ply, 7 a carcass reinforcing member, 8 a chafer using metal cords in this example, and 9 a stiffener composed of a composite rubber stock.

The conventional stiffener 9 present between the carcass ply 5 and its turned-over portion 6 is composed of a very hard single rubber stock and extends upwardly from its base and beyond an end 8' of the chafer 8 while enclosing the bead core 4. Therefore, under nominal inflation pressure the bead section 3 is forced to a rim flange Rf of a rim R, so that the thick base portion of the stiffener in spite of the use of the hard rubber is pressed between the carcass ply 5 and its turned-over portion 6 and is apt to be pushed out of the bead section 3 toward the side wall 2. As a result, a distortion in radial direction of the tire is caused at an end 6' of the turned-over ply portion 6 and an end 8' of the chafer 8 so as to separate these ends from the rubber. Furthermore, a distortion in circumferential direction of the tire is caused between the cords of the carcass ply 5 at ground contact area of the tire by the deformation Db of the bead section 3 followed to the deformation Ds of the side wall section as shown in FIG. 1. In addition to these distortions, the tire is exposed to various severe circumstances such as bending and other distortions during the revolution of the tire, and particularly the end 8' of the chafer 8 located at a position remote from the base part of the bead section 3 is considerably subjected to the distortion in circumferential direction of the tire and as a result, a separation of the cords from the rubber is easily caused.

Moreover, the term "end of metal cord chafer" used herein means the cord end located along or close to the turned-over portion of the carcass ply and facing to the side wall.

According to the invention, as shown in FIG. 2, a carcass reinforcing member 7 having a bias structure is mainly located at the surface of the carcass ply 5 opposing to the end 8' of the chafer 8 which is liable to cause the cord separation. The carcass reinforcing member 7 is composed of two rubberized cord fabrics, whose cords are optionally selected from the group consisting of organic fibers such as nylon fiber, rayon fiber, polyester fiber, vinylon fiber and the like, and inorganic cords such as metal wire, glass fiber and the like. These two cord fabrics are crossed with each other at an angle larger than 60°, preferably 70°–85° with respect to the direction of cord arrangement of the carcass ply. In this case, the cord angle of the reinforcing member 7 must be within the above range at the position opposing to the cord end 8' and parallel to the tie axle. In general, the outer portion in radial direction of the tire is mostly larger in the cord angle of the carcass reinforcing member than the inner portion thereof.

In the embodiment of FIG. 2, the carcass reinforcing member 7 is arranged at the outside of the carcass ply 5 opposing to the end 8' of the chafer 8 composed of metal cords and the end 6' of the turned-over ply portion 6 through the rubber stiffener 9 covering these ends. However, the reinforcing member 7 may be arranged at the inside of the carcass ply 5.

The carcass reinforcing member 7 extends from the inward to the outward in radial direction of the tire and its width is appropriately selected depending upon the kind of the cord and the number of cord fabrics used. Particularly, it is desirable that the upper end of the reinforcing member directed toward the side wall does not pass over the stiffener 9.

The composite rubber stiffener 9 consists of a hard rubber stock 9a constituting the lower part of the stiffener which encloses the bead core 4 and extends upwardly in radial direction of the tire, and a soft rubber stock 9b constituting the upper part of the stiffener and absorbing the deformation by press between the carcass ply 5 and the rim flange Rf. In the embodiment of FIG. 2, the hard rubber stock 9a is secured to the ends 6' and 8' of the turned-over ply portion 6 and the chafer 8 and elongates in a tongue-like form, while the soft rubber stock 9b is disposed between such elongated portion and the carcass reinforcing member 7. In such a construction, the deformation of the hard rubber stock 9a in radial direction of the tire under nominal inflation pressure is absorbed by the soft rubber stock 9b, while the divergence between the cords of the carcass ply caused at ground contact area under a load is prevented by the carcass reinforcing member 7. As a result, the distortions in radial and circumferential directions of the tire can be effectively intercepted at the cord ends of the turned-over ply portion 6 and the chafer 8. In general, it is preferable that the hardness of the hard rubber stock 9a is more than 70 according to Shore A scale and that of the soft rubber stock 9b is lower than the above value, the difference of hardness between both stocks being more than 10. Moreover, two or more of rubber stocks having different hardnesses may be used as far as circumstances permit.

FIG. 3 shows another embodiment of the tire according to the invention, wherein the chafer 8 consists of two rubberized metal cord layers, and end 8'' of the outer layer being higher than an end 8' of the inner layer in radial direction of the tire, and the composite rubber stiffener 9 consists of the hard rubber stock 9a enclosing the bead core 3 and terminating at a middle position of the turned-over ply portion 6, and the soft rubber stock 9b extending upwardly from the end of the hard rubber stock 9a beyond the end 8'' of the outer chafer in radial direction of the tire.

In the embodiment of FIG. 3, if the hardness of the coating rubber (rubberizing material) for each metal cord is higher than that of the soft rubber stock 9b, the protection effect on the end of each metal cord and hence the effect of intercepting the distortions can be improved because the end of each metal cord is covered with the coating rubber softened during vulcanization.

FIG. 4 shows the further embodiment of the tire according to the inention, wherein the end 6' of the turned-over ply portion 6 is arranged at a position higher than the end 8' of the chafer 8 in radial direction of the tire, and a rubber layer 10 having a hardness substantially equal to that of the hard rubber stock 9a is disposed so as to enclose the ends 6' and 8', and a rubber layer 11 having a hardness substantially equal to that of the soft rubber stock 9b is disposed between the rubber layer 10 and the outer rubber layer constituting the tire. In this case, the carcass reinforcing member 7 is adhered to the carcass ply 5 at a position opposing to the end 6' of the turned-over ply portion 6 through the soft rubber stock 9b.

FIG. 5 shows the other embodiment of the tire according to the invention, wherein a rubber layer 13 is disposed so as to separate the uppermost portion 12 of the carcass reinforcing member 7 from the surface of the carcass ply 5 in radial direction of the tire. In this case, the rubber layer 13 has a thickness of 0.5-3 mm and a hardness substantially equal to that of the soft rubber stock 9b, and the width of the uppermost portion 12 is 5-15 mm (corresponding to 7-21% of the whole width of the carcass reinforcing member in this embodiment).

In this embodiment of FIG. 5, the presence of the rubber layer 13 serves to effectively disperse a shearing strain which is apt to be caused between the uppermost portion 12 of the carcass reinforcing member 7 and the carcass ply 5 under load, so that the reinforcing effect for the carcass ply 5 is enhanced.

The invention will be explained in detail with reference to the following example.

There was provided a radial tire of TB 10.00R20 14PR having the structure of the bead section as shown in FIG. 3 wherein the carcass reinforcing member 7 is composed of two rubberized nylon cord fabrics of 1260 d/2 cords which are crossed with each other at an angle of 80° with respect to the cord direction of the carcass ply 5 and adhered at a width of 70 mm to the surface of the carcass ply 5 along the whole periphery of the tire at a position opposing to the end 6' of the turned-over ply portion 6 and the ends 8' and 8'' of the chafers 8 through the soft rubber stock 9b.

The number of cords in the carcass reinforcing member 7 was 41 cords/50 mm as measured in a direction perpendicular to the axis of cord. Moreover, the upper end of the carcass reinforcing member 7 did not pass over the upper end of the stiffener 9 and also there was a difference between the two fabrics of the carcass reinforcing member 7 by a distance of 5 mm along the carcass ply 5.

The hardness of the hard rubber stock 9a was 78 according to Shore A scale, that of the soft rubber stock 9b was 56, and that of the coating rubber for the cords of the carcass ply and chafer was 72.

Such tire was mounted on a rim of 7.00 T and air was filled therein to an inflation pressure of 7.0 Kg/cm$^2$. Then, when the distortion in the end of the chafer 8 was measured under a load of 3600 Kg, the distortions in circumferential and radial directions of the tire according to the invention became 50% and 60%, respectively smaller than those of the conventional tire having no carcass reinforcing member and soft rubber stock.

When the tires were run by mounting them on the practical lorry at 94,500 km, the condition of said cord end was observed. The conventional tire showed a slight separation in the end of the turned-over ply portion and a separation of rubber at an average length of 4 mm from the cord end of the chafer over the whole periphery of the tire, while there was not observed the separation at any position in the tire according to the invention.

As mentioned above, according to the present invention the durability of the bead section can be considerably improved by effectively protecting the carcass ply and ends of turned-over ply portion and chafer, which are difficult to adhere to rubber, with the carcass reinforcing member and the composite rubber stiffener.

What is claimed is:

1. A pneumatic radial type tire having at least one carcass ply composed of metal cords in a substantially radial arrangement and a pair of bead sections, each of said sections comprising a turned-over portion folded carcass ply around a bead core from inward to outward of the tire, at least one chafer consisting of rubberized metal cords arranged along and adjacent to the turned-over portion of the carcass ply, a rubber stiffener disposed between the carcass ply and its turned-over portion with the chafer and extending outwardly from the vicinity of the bead core beyond outermost cord ends of the turned-over portion and of the chafer in radial direction of the tire, and a carcass reinforcing member composed of at least two rubberized cord fabrics or organic fibers secured to the surface of the carcass ply and being crossed with each other in their laminate interface; said carcass reinforcing member being located opposite to the outermost cord ends of the turned-over portion of the carcass ply and of the chafer in radial direction of the tire by a given width and having a cord angle of at least 60° with respect to the direction of the cord of the carcass ply in each cord fabric, said angle being larger at the outer portion than at the inner portion in radial direction of the tire, and said rubber stiffener disposed between the turned-over portion of the carcass ply with the chafer and the carcass secured with the carcass reinforcing member being composed of a composite of a hard rubber stock in the side of the turned-over portion and a composite of a relatively soft rubber stock, the difference in hardness between the hard rubber stock and the soft rubber stock being more than 10 of Shore A hardness, in the side of the carcass reinforcing member, the relatively soft rubber stock extending along the carcass reinforcing member from its corresponding inside portion to outward beyond upper portion thereof in radial direction of the tire to protect the outermost cord ends of the turned-over portion and the chafer from distortion of the stiffener which yields by pressure between the carcass ply and a rim flange and from divergence between the cords of the carcass ply when the inflated radial type tire is subjected to service under load.

2. The tire as claimed in claim 1 wherein said carcass reinforcing member is secured to the outer surface of said carcass ply.

3. The tire as claimed in claim 2 wherein the uppermost portion of said carcass reinforcing member in radial direction of the tire is secured to the outer surface of said carcass ply through a rubber layer.

4. The tire as claimed in claim 1 wherein said carcass reinforcing member is secured to the inner surface of said carcass ply.

5. The tire as claimed in claim 1 wherein the cord angle of said carcass reinforcing member to said carcass ply is 70° to 85° at the upper portion of the carcass reinforcing member in radial direction of the tire.

6. The tire as claimed in claim 1 wherein said carcass reinforcing member is composed of two plies of nylon cord layer.

7. The tire as claimed in claim 1 wherein said stiffener comprises a rubber stock having a smaller hardness than that of a rubber stock in vicinity of said bead core and disposed between said carcass reinforcing member and said cord end at the outermost side of at least one of the turned-over ply portion and the chafer in radial direction of the tire along the carcass reinforcing member so as to separate the cord end from the carcass reinforcing member.

8. The tire as claimed in claim 1 wherein said stiffener, the difference of hardness between a rubber stock having a smaller hardness and disposed along said carcass reinforcing member and a rubber stock having a larger hardness and disposed at the base end portion of the stiffener is not less than 10 according to Shore A scale.

9. The tire as claimed in claim 8 wherein the hardness of said hard rubber stock disposed at the base end portion of said stiffener is more than 70 according to Shore A scale.

10. The tire as claimed in claim 1 wherein on the outside of said rubber stock having a smaller hardness along said carcass reinforcing member is laminated a hard rubber layer in an axle direction of the tire so as to protect said cord end at the outermost side of at least one of the turnedover ply portion and the chafer in radial direction of the tire.

11. The tire as claimed in claim 10 wherein said hard rubber layer is covered on both sides and end of the cord at the outermost side of at least one of the turned-over ply portion and the chafer in radial direction of the tire.

12. The tire as claimed in claim 10 wherein said hard rubber layer is covered on both sides and ends of the cords of the turned-over ply portion and the chafer in radial direction of the tire.

13. The tire as claimed in claim 10 wherein said hard rubber layer is covered on both sides and ends of the cords of the turned-over ply portion and the chafer in radial direction of the tire and is sandwiched between a rubber stock having a smaller hardness and disposed along said carcass reinforcing member on the one side and a rubber layer having a hardness substantially equal to that of said rubber stock on the other side.

14. The tire as claimed in claim 1 wherein said cord of at least one of the turned-over ply portion and the chafer having a cord end at the outermost side in radial direction of the tire is coated with a rubber having a hardness larger than that of the rubber stock disposed along said carcass reinforcing member.

* * * * *